United States Patent Office 3,271,100
Patented Sept. 6, 1966

3,271,100
DYEING AND PRINTING PROCESS
Donald K. Clough, Bradford, England, assignor to Sandoz Ltd. (also known as Sandoz A.G.), Basel, Switzerland
No Drawing. Filed May 6, 1965, Ser. No. 453,826
Claims priority, application Switzerland, Nov. 13, 1961, 13,128/61
12 Claims. (Cl. 8—54)

The present application is a continuation-in-part of my application Ser. No. 237,368; filed November 13, 1962 and now abandoned and relates to a process for dyeing wool which comprises applying to the wool an aqueous solution containing as essential ingredients a water-soluble hydroxylamine salt and a water-soluble dye selected from the group consisting of an acid dye, a reactive dye and a direct dye and subjecting the wool to a wet heat treatment at temperatures ranging from 60° to 110° C. for at least 5 minutes.

The wool may be dyed in any of the usual manufacturing forms, e.g. as loose fibers, slubbing, tops, worsted yarn, carpet yarn, knitting yarn, knitted or woven fabric, felt, etc.

Water-soluble dyes particularly suitable for the process are the acid dyes which can be applied from a strongly to weakly acid or neutral bath, e.g. the 1:1 and 1:2 metal-complex azo dyes, the monoazo, disazo, anthraquinone, phthalocyanine, triarylmethane, xanthene, nitro and dioxazine dyes which bear at least one sulfonic acid group and have affinity for wool, the direct dyes which in neutral to acid bath have affinity for wool and the reactive dyes which form a true chemical linkage with the fiber.

The acid dyes utilized in the process can also be characterized by their dyeing properties. Customarily the following groups are distinguished:
(a) The levelling dyes which possess good migrating properties and easily yield level dyeings;
(b) The milling dyes which possess poor migrating properties but yield dyeings fast to washing, milling and perspiration.

The reactive dyes combine the good migrating properties (before their fixation) with the excellent fastness to washing, milling and perspiration (after their fixation); they bear as reactive group a halogenated hererocyclic radical, e.g. a di- or trichloropyrimidyl radical, a 4-chloro-6-amino-triazinyl-2-radical or a 4,6-dichloro-triazinyl-2-radical or a 2,3-dichloro-quinoxalyl-6-carbonyl radical, or a halogenated or sulfated aliphatic radical, e.g. a chloroacetyl, β-chloropropionyl, β-sulfatopropionyl, β-sulfatoethylsulfonyl or β-sulfato-ethylamino-sulfonyl radical, an acrylyl, an β-chloro-acrylyl or a vinylsulfonyl radical.

Examples of dyes utilizable in the present process are e.g. metal complex dyes:

the 1:1-chromium complex compound of sodium 1-hydroxy - 2-(2'-hydroxynaphthyl-1'-azo)-naphthalene-8-sulfonic-acid amide-4'-sulfonate (blue);
the 1:2 chromium complex compound of 1-(2'-hydroxy-5' - methylsulfonylphenylazo) - 2-hydroxy-8-acetylamino-naphthalene (gray);
monoazo dyes:

sodium 1-(5'-acetylaminophenylazo)-2-amino-8-hydroxy-naphthalene-6,2'-disulfonate (red);
disazo dyes:
sodium 1-amino-2-(4'-nitrophenylazo)-7-phenylazo-8-hydroxynaphthalene-3,6-disulfonate (bluish black);
anthraquinone dyes:

sodium 1 - amino-4-phenyl-amino-anthraquinone-2-sulfonate (blue);
phthalocyanine dyes:

the sodium salt of copper-phthalocyanine-disulfonic acid (turquoise blue);
triarylmethane dyes:
the blue dye of the formula

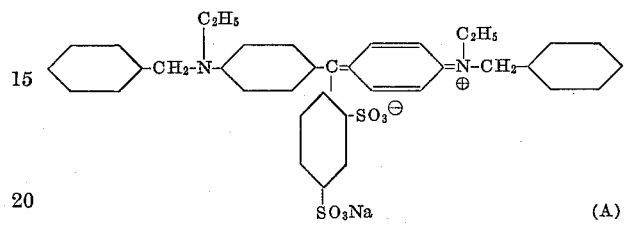

(A)

Xanthene dyes: the violet dyes of the formulae

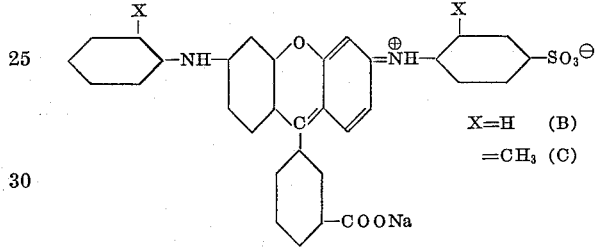

X=H (B)
=CH₃ (C)

nitro dyes: the yellowish brown dye of the formula

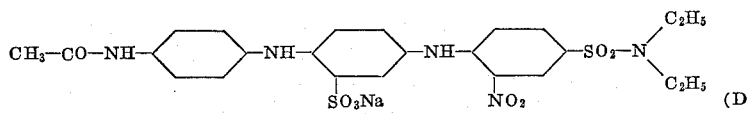

(D)

dioxazine dyes: the blue dye of the formula

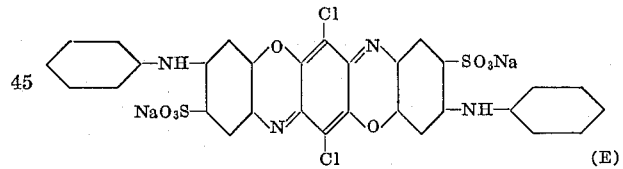

(E)

direct dyes: sodium 1 - [3'-methoxy-4'-(1''-hydroxy-6''-phenylamino-naphthyl - 2'' - azo)-6'-methyl-phenylazo]-8-hydroxy-naphthalene - 3,6,3''-trisulfonate (reddish blue);
levelling dyes: sodium 1-amino-4-(4'-acetylamino-phenylamino)-anthraquinone-2,5-disulfonate (blue);
milling dyes: 1,4 - bis-(2',4',6'-trimethyl-3'-sulfo-phenylamino)-anthraquinone as the disodium salt (blue);
reactive dyes: sodium 1-hydroxy-2-phenylazo-8-trichloropyrimidylamino-naphthalene-3,6,2'-trisulfonate (bluish red),
sodium 1 - amino-4-[4'-(4''-chloro-6''-phenylamino-1'', 3'',5''-triazinyl - 2'' - amino)-phenylamino]-anthraquinone-2,3',4'''-trisulfonate (blue),
sodium 1 - [4' - (4'',6''-dichloro-1'',3'',5''-triazinyl-2''-amino) - phenylazo]-2-amino-8- hydroxynaphthalene-6,2'-disulfonate (bluish red),
sodium 1 - amino - 4 - (3'-β-sulfato-ethylsulfonyl-phenylamino)-anthraquinone-2-sulfonate (blue),
the sodium salt of copper-phthalocyanine-di-sulfonic acid-(β-sulfato-ethylamide) (turquoise),
sodium 1 - amino-4-(3'-chloracetylamino-phenylamino)-anthraquinone-2-sulfonate (blue), sodium 1 - hydroxy-2-phenylazo-8-(4″-methyl-3″-chloracetyl-aminomethyl-benzoylamino)-naphthalene -3,6,2′-trisulfonate (bluish red), sodium 1-amino-4-[2′,4′,6′-trimethyl - 3′ - (α-chloracrylylaminomethyl)-phenylamino]-anthraquinone-2-sulfonate (blue).

In principle every available water soluble hydroxylamine salt can be employed, provided that it is stable to the heat treatment and that its anion does not interfere in the dyeing process, for example the ferric-hydroxylammonium sulfate which is decomposed in the heat, or a hydroxylammonium stearate or oleate which in the acid dyebath would yield free stearic or oleic acid are not utilizable. In this process the important part of the salt is the cation

and every solution containing this cation will operate. Among the suitable hydroxylamine salts the following may be mentioned: the phosphate, sulfamate, bromide, acetate, formate, propionate, lower alkane-sulfonate, benzene-, toluene- or xylenesulfonate, fluosilicate, magnesium sulfate double salt, calcium or magnesium chloride double salt, and above all the chloride, the neutral and the acid sulfate. It is also possible to add the hydroxylamine base itself, e.g. as an aqueous solution, to the dyebath, padding liquor or printing paste, if they contain a sufficient amount of acid to maintain the desired pH-value even after the addition of the hydroxylamine.

The amount of hydroxylamine salt used may vary from 0.5% to 5%, or preferably from 1% to 3%, O.W.F., which means based on the weight of the fiber. Increasing the amount of hydroxylamine salt over 5% does not further improve the properties of the dyeings. A liquor ratio of 1:0.5, e.g. in padding or printing, to 1:200, e.g. in dyeing, or preferably 1:5 to 1:60, may be chosen.

The dyeing process can be carried out in one step or in two steps. In the one step process impregnation and wet heat treatment can be effected in a conventional dyebath preferably at temperatures from about 85° C. to the boiling temperature for about ½ to 1½ hours. It is of course also possible to work at lower temperatures, e.g. at 60°–70° C., but in this case the composition of the dyebath is to be adapted to the dyes employed, e.g. by adding a solvent such as n-butanol or benzyl alcohol, and the heat treatment prolonged, if necessary, since not all acid and direct dyes are able to draw onto wool at temperatures of about 60° C.

When the dyeing process is carried out in two steps, the first step consists in an impregnation, which may be total (padding) or partial or local (printing) of the wool to be dyed. The second step, the wet heat treatment, may be a steaming at a temperature of about 100° C. for at least 5 minutes and preferably 10 to 30 minutes or a conditioning in a wet atmosphere at temperatures ranging from 60° to 110° C., but preferably from 85° to 100° C.

Of course the dyebath, the padding liquor or the printing paste may contain, beside the hydroxylamine salt and the dye, any of the commonly used textile chemicals, for example fluorescent brightening agents, levelling agents, wetting agents, wool protective agents, sodium chloride or sulfate etc.

The process is suitable for producing dyeings or printings of all depths, but is used preferably for shades of light depth and pale pastel tones. For these, amounts of 0.005% to 5%, or preferably 0.02 to 1%, of dye calculated on the weight of the goods are employed.

With the process of the invention clearer and more brilliant dyeings are obtained than with the conventional dyeing or printing methods. These dyeings have better light fastness than dyeings produced by conventional methods, and equally good wet fastness properties.

The light fastness of dyeings produced in the presence of hydroxylamine salts is better than that of normal dyeings. In normal dyeings the yellow self-colour of the wool is the first to fade on exposure to light, with the result that the dyeing becomes lighter. In dyeings dyed with hydroxylamine the wool no longer retains its yellow self-colour so that there is better tone-in-tone fading on exposure to light.

The process for wool dyeing or printing is carried out to best advantage at a pH value of 1 to 8 in the presence of sulfuric, phosphoric, formic or acetic acid, ammonium sulfate, ammonium acetate, sodium acetate, sodium formate or mono-or di-sodium phosphate, etc.

In the case of the reactive dyes, i.e. dyes which are able to react with wool under formation or a chemical covalent linkage, the dyebath may be neutralized or even made weakly alkaline, e.g. brought to a pH-value of 8, at the end of the dyeing process and maintained for about 10 to 30 minutes at 80°–95° C. in order to complete the chemical fixation of the dye with the wool. Suitable neutralizing agents include sodium carbonate, bicarbonate, acetate, secondary phosphate or borax or the corresponding potassium salts, ammonia, or substances which develop ammonia on heating such as urea or hexamethylenetetramine.

A typical dyeing procedure is to enter the goods in the dyebath at 50° C. and to bring the bath to 100° C. in 20–40 minutes, the goods then being dyed for 30 to 120 minutes at this temperature. The reducing agents normally used in wool dyeing, e.g. hydrosulfite, zinc formaldehyde sulfoxylate, sodium formaldehyde sulfoxylate, serve either to bleach raw wool or to strip faulty dyeings. Experience has shown that wool which has been bleached or stripped with reducing agents must be thoroughly washed off before it is re-dyed, to ensure that the dyes are not attacked by residual reducing agent.

Surprisingly, the salts of hydroxylamine, notably hydroxylamine sulfate, exert an effective and permanent bleaching action which clears the yellow self-colour of the wool, yet at the same time they do not attack the dyes.

Hydroxylamine sulfate can therefore be added to the dyebath or printing paste to eliminate the natural yellow colour of the wool fiber and thereby permits brighter shade to be obtained, without adverse effect upon the dyes in the bath.

The use of hydroxylamine salts in the dyeing of polyacrylonitrile fibers, e.g. as described in U.S. Patent 2,937,067, is based on the fact that the nitrile groups of the polyacrylonitrile fiber

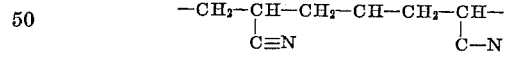

react with hydroxylamine to yield amidoxime groups

which possess a considerably greater affinity for wool dyes than the nitrile groups from which they are derived (see British Patent 786,960, page 2, lines 31–43 and page 4, lines 1–15; characterization of the reaction products from —C≡N and NH₂—OH).

This reaction of hydroxylamine with nitrile groups takes place also in weakly acid medium, e.g. in the pH range of 2 to 7, i.e. under the conditions usually employed for acid dyes (see British Patent 838,296, page 1, lines 41–58; page 2, lines 15–25 and Example 1).

The present invention on the contrary does not involve a chemical reaction between the wool and the hydroxylamine under the dyeing conditions but only an elimination of the discoloration of the wool, i.e. of an impurity. The presence of the hydroxylamine salt does not influence the drawing up properties of the dyes nor the affinity of the wool and furthermore does not affect the dyes themselves so that no comparison is possible between the dyeing of the polyacrylonitrile fibers which have a paraffinic main chain and nitrile side groups and that of wool which has a polyamide main chain and amino and/or carboxy side groups, e.g.

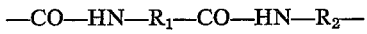

—CO—HN—R₁—CO—HN—R₂— where $R_1$ and $R_2$ low molecular alkylene groups which may carry amino and/or carboxyl group.

Another patent which at first sight seems to describe a process similar to that of the present invention is U.S. Patent 1,758,877. According to this patent wool is dyed in the presence of sodium acid sulfate (sodium bisulfate) instead of a mixture of sodium sulfate (Glauber's salt) and sulfuric acid. However, the crude sodium bisulfate—obtained in the production of nitric acid from sodium nitrate (Chile saltpeter) and concentrated sulfuric acid—and called nitre cake contains impurities, e.g. $NaNO_3$, which have injurious effect upon sensitive dyes (see Kirk-Othmer Encyclopedia of Chemical Technology vol. 9, page 337, last paragraph, (1952)). In order to prevent these impurities from discoloring the sensitive dyes reducing agents are added to the dyebath, e.g. stannous chloride, sodium sulfide, ferrous sulfate, zinc dust, carbon, hydroxylamines, but preferably oxalic acid, in an amount of about 1% (oxalic acid) to 3% (stannous chloride) of the weight of the nitre cake. From this enumeration it is clear that the elimination of the injurious nitric acid is the sole purpose of the addition of the reducing agents and that an excess of reducing agent is to be avoided as far as it is possible since e.g. a sodium sulfide excess would yield poisonous hydrogen sulfide, or an excess of carbon would unpleasantly pigment the dyeing and render it dull. On the other hand the preferred reducing agent, oxalic acid, does not eliminate the yellow self colour of the wool so that the object of the present invention, i.e. the elimination of the yellow self colour of the wool, was not described nor suggested in the said U.S. patent.

In the following examples the parts and percentages are by weight and the temperatures are in degrees centigrade.

*Example 1.*—A dyebath is prepared with 500 parts of water, 20 parts of a 10% formic acid solution, 10 parts of anhydrous sodium sulfate, 0.1 part of the dye of the formula

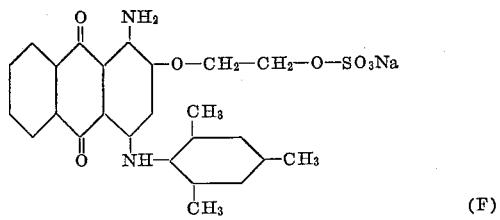

(F)

U.S.P. 2,117,569 Ex. 1 and 1.5 parts of hydroxylamine sulfate:

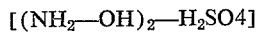

[(NH₂—OH)₂—H₂SO₄]

100 parts of unbleached wool fabric are entered at 40°, the bath heated to 100° in 45 minutes and held at this temperature for 1 hour.

A violet dyeing is obtained which is clearer and more brilliant than one produced without the addition of hydroxylamine sulfate. The light fastness is excellent and the wet fastness properties good.

The depth of the dyeing obtained by the above procedure can be varied by increasing the amount of dye from 0.1 part to any amount up to 4 parts. Similarly, the 20 parts of 10% formic acid solution can be replaced by 3 to 6 parts of ammonium sulfate or 0.5 to 4 parts of glacial acetic acid or 0.2 to 2 parts of 80% phosphoric acid; and the 1.5 parts of hydroxylamine sulfate can be increased to 3 parts or reduced to 0.3 part or replaced by hydroxylamine chlorhydrate, phosphate, acetate or acid sulfate. Under the conditions described above the pH value of the dyebath is 3.5 to 4.5.

The liquor ratio may vary within wide limits, but is preferably between 1:5 and 1:100, especially between 1:30 and 1:60.

*Example 2.*—When the 0.1 part of violet dye used in the preceding example is replaced by 0.1 part of the dye sodium 1-amino-4-cyclohexylamino-anthraquinone-2,5-disulfonate and 1.5 parts of hydroxylamine chloride are included in the bath, a blue dyeing is obtained which is considerably clearer and brighter than one produced without the addition of hydroxylamine chloride. This dyeing also has excellent light and wet fastness properties.

*Example 3.*—The dyebath is set with 4500 parts of water, 0.1 part of the dye of the formula

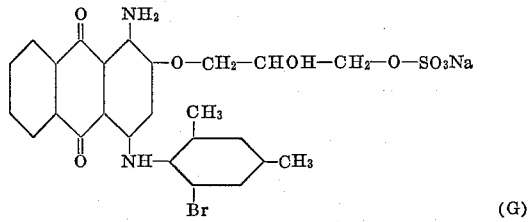

(G)

0.1 part of a fluorescent brightening agent of the aminocumarin series, and 1.5 parts of hydroxylamine acetate. 100 parts of wool fabric are entered at 30°. Over the next 15 minutes the bath is heated to 100° and is maintained at this temperature for a further 30 minutes. Then 20 parts of a 10% formic acid solution are added and the goods dyed to shade in a further 30 minutes at 100°. During the dyeing process the water lost by evaporation is continuously replaced. The dyed wool is rinsed with water and dried. A violet dyeing is obtained which is considerably clearer and more brillant than one produced without hydroxylamine acetate. The light fastness too is appreciably better while the wet fastness properties are equal to those of a dyeing produced by conventional methods. A further advantage of the present process is that the wool can be dyed in the unbleached state, as it is bleached during the dyeing process.

In place of 0.1 part of the violet dye used above 0.1 to 4 parts of one of the following dyes can be employed to give dyeings of different depth: sodium 1-amino-4-cyclohexylamino-anthraquinone-2,5-disulfonate (blue), sodium copper-phthalocyanine-disulfonate (turquoise blue), sodium 1-amino-4-(2′,4′,6′-trimethyl-phenylamino)-anthraquinone-2-sulfonate (blue) or reactive dyes, e.g. those of the anthraquinone series having a trichloro- and a dichloropyrimidyl or a dichloro- or mono-chlorotriazinyl radical and 1, 2 or 3 sulfonic acid groups such as sodium 1-amino 4 - (3′ - trichloropyrimidylaminophenylamino)-anthraquinone-2,7-disulfonate (blue) or sodium 1-amino-4-[3′-(4″-chloro - 6″ - phenylamino-1″,3″,5″-triazinyl-2″-amino)-phenylamino]-anthraquinone-2,4′,4‴-trisulfonate (blue).

To dyebaths of the composition given above may be added other dyeing assistants such as levelling agents of the alkylpolyglycol ether or alkylaminopolyglycol ether type, wetting agents of the sulfated oil type such as sulforicinates and sulfated fatty acid esters, and wool protective agents produced from protein decomposition products. The pH value of the dyebath is 3.5 to 5.0. The formic acid used in the example can be replaced by 3 to 6 parts of ammonium sulfate or 0.5 to 4 parts of glacial acetic acid or 0.2 to 2 parts of 80% phosphoric acid. The 1.5 parts of hydroxylamine acetate can be replaced by 0.5 to 3 parts of hydroxylamine acetate, phosphate or acid sulfate, a liquor ratio between 1:20 and 1:60 being preferred.

*Example 4.*—100 parts of wool fabric are entered in a dyebath at 40° prepared with 5000 parts of water, 0.2 part of the 1:2-chromium complex compound of 1-(2′-hydroxy - phenylazo) - 2 - hydroxy-8-dimethylaminosulfonylamino naphthalene - 5′ - sulfonic - acid-methylamide (bluish gray), 1.5 parts of hydroxylamine sulfate and 2 parts of ammonium sulfate. The bath is heated to 100° over 15 minutes and held at this temperature for 1 hour.

The dyed wool is rinsed with water and dried. A gray dyeing is obtained which is considerably clearer and brighter than a comparable dyeing produced without hydroxylamine sulfate. It has excellent light fastness and good wet fastness.

To obtain dyeings of different depth, the 0.2 part of the above mentioned dye can be replaced by 0.02 to 3 parts of the same dye or one of the following dyes: acid milling dyes: the 1:2-chomium complex compound of 1-phenyl-3-methyl-4-(2'''-hydroxy-3''-nitro-5''-chloro-phenylazo)-5-pyrazolone-3'-sulfonic acid-methylamide (bluish red), sodium 2,2'-dichloro-4-[2''-(2'''',4''',6'''-trimethylphenylamino)-8''-hydroxynaphthyl-1''-azo]-4'-n-octyloxy-carbonylamino-1,1'-diphenyl-5,6''-disulfonate (bluish red), sodium 2,2'-dimethyl-4-(2''-amino-8''-hydroxynaphthyl-1''-azo)-4'(β-phenoxy-ethoxycarbonylamino)-1,1-diphenyl-6''-sulfonic acid-ethylamide-5-sulfonate (red), sodium 1-[4'-(4''-amylphenoxy)-phenylazo]-2-(2''',4''', 6'''-trimethylphenylamino)-8-hydroxynaphthalene-6,2'-disulfonate (bluish red), sodium 4,4'-di-(2''-hydroxy-3''-phenylaminocarbonyl-naphthyl-1''-azo)-1,1'-diphenyl-2,2'-disulfonate (bluish red), 4,4'-di-(4''-amino-3''-sulfo-anthraquinonyl-1''-amino)-1,1'-diphenylmethane as the disodium salt (blue), the blue dyes of the formulae:

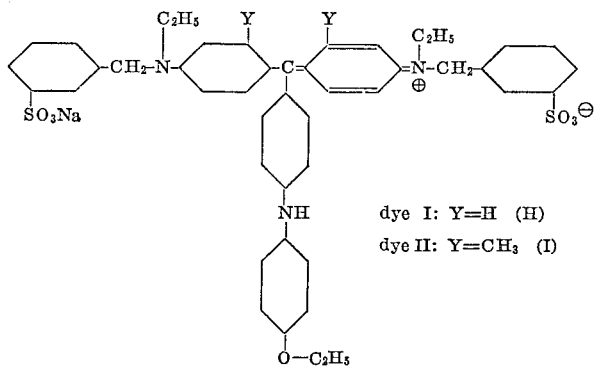

dye I: Y=H (H)
dye II: Y=CH₃ (I)

the bluish green dye of the formula

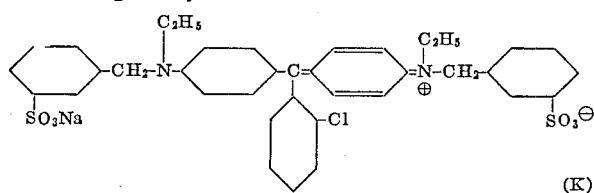

(K)

the green dye of the formula

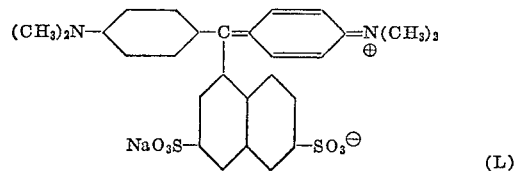

(L)

sodium 1-amino-4-(2',4',6'-trimethyl-3',5'-dibromophenylamino)-anthraquinone-2-sulfonate (reddish blue),
1,4-di-(2',4',6'-trimethyl-3'-bromo-5'-sulfophenylamino)-anthraquinone as the di-sodium salt (reddish blue),
1,4-di-(2',4',6'-trimethyl-3'-sulfo-phenylamino)-6,7-dichloro-anthraquinone as the di-sodium salt (blue),
1,4-di-[4'-(4''-chlorophenoxy)-2'-sulfo-phenylamino]-anthraquinone as di-Na salt (bluish green),
sodium 1-(4'-phenylazo-naphthyl-1'-azo)-4-phenyl-amino-naphthalene-5,2''-disulfonate (reddish navy),
sodium 4-(2''-hydroxynaphthyl-1''-azo)-4'-(4''-phenyl-sulfonyloxy-phenylazo)-1,1'-diphenyl-6'',8''-disulfonate (yellowish red),
sodium 1-hydroxy-2-(2'-phenoxy-5'-chlorophenylazo)-8-(4''-methylphenylsulfonylamino)-naphthalene-3,6-disulfonate (bluish red),
4,4'-di-(-1''',7''-dihydroxy-3''-sulfonaphthyl-2''-azo)-3,3'-dimethoxy-1,1'-diphenylcyclohexane as the sodium salt (bordeaux),
sodium 1-hydroxy-2-(4'-cyclohexylphenylazo)-8-(2'',5'-dichlorobenzoylamino)-naphthalene-3,5-disulfonate (bluish red),
sodium 1-hydroxy-2-(2'-phenoxyphenylazo)-7-[4''-(4''-methyl-phenylsulfonyloxy)-phenylazo]-naphthalene-3,6-disulfonate (red),
sodium 1-hydroxy-2-(4'-N-cyclohexyl-N-acetylamino-phenylazo)-8-benzoylamino-naphthalene-3,5-disulfonate (red),
sodium 1-(4'-phenylsulfonyloxyphenylazo)-4-[4''-(4'''-nitrophenylamino)-phenylazo]-naphthalene-6,2'''-disulfonate (reddish orange);

reactive dyes: sodium 1-hydroxy-2-phenylazo-8-(3''-trichloro-pyrimidylamino-benzoylamino)-naphthalene-3,6,2'-trisulfonate (red),
sodium 1-hydroxy-2-(3'-trichloropyrimidylaminophenyl-azo)-naphthalene-4,6-disulfonate (scarlet),
sodium copper-phthalocyanine-sulfonic acid-(3'-trichloropyrimidylaminophenylamide-sulfonic acid amide-disulfonate (turquoise blue),
the 1:2-cobalt complex compound of sodium 1-hydroxy-2-(2'-hydroxy-5'-nitrophenylazo)-8-trichloropyrimidyl-amino-naphthalene-3,6-disulfonate (reddish gray),
the 1:2-chromium complex compound of sodium 1-hydroxy-2-(2'-hydroxy-5'-choro-phenylazo)-8-trichloro-pyrimidylamino-naphthalene-3,6-disulfonate (navy blue),
the copper complex compound of sodium 1-hydroxy-2-(2'-hydroxyphenylazo)-8-trichloropyrimidylamino-naphthalene-3,6,5'-trisulfonate (violet),
sodium 1-amino-4-(3'-trichloropyrimidylamino-phenyl-amino)-anthraquinone-2,4'-disulfonic acid (reddish blue),
sodium 1-(2',5'-dichlorophenyl)-3-methyl-4-(3''-dichloropyrimidylaminophenylazo)-5-pyrazolone-4', 6''-disulfonate (greenish yellow),
sodium 1-hydroxy-2-(4'-methylphenylazo)-8-dichloro-pyrimidylamino-naphthalene-3,6-disulfonate (bluish red),
sodium 2-[2'-acetylamino-4'-(4''-chloro-6''-amino-1''', 3'',5''-triazinyl-2''-amino)-phenylazo]-naphthalene-4,8-disulfonate (reddish yellow),
sodium 1-hydroxy-2-(4'-methoxy-phenylazo)-6-[N-methyl-N-(4''-chloro-6''-methoxy-1'',3'',5''-triazinyl-2''-amino]-naphthalene-3,2'-disulfonate (scarlet),
sodium 1-amino-4-[3'-(4'',6''-dichloro-1'',3'',5''-triazinyl-2''-amino)-phenylamino]-anthraquinone-2,4'-disulfonate (reddish blue),
sodium 1-hydroxy-2-phenylazo-8-(4',6'-dichloro-1',3',5'-triazinyl-2'-amino)-naphthalene-3,6-disulfonate (bluish (red),
potassium 1-hydroxy-2-[2'-methoxy-5'-(β-sulfato-ethyl-sulfonyl)-phenylazo]-naphthalene-5-sulfonate (red),
the copper complex compound of potassium 1-hydroxy-2-[2'-hydroxy-5'-(β-sulfato-ethyl-sulfonyl)-phenylazo]-8-acetylamino-naphthalene-3,6-disulfonate (violet),
sodium copper phthalocyanine-sulfonic acid-[3'-(β-sulfato-ethylsulfonyl)-phenylamide]-disulfonate (turquoise blue),
sodium 1-amino-4-[3'-(β-sulfato-ethylaminosulfonyl)-phenylamino]-anthraquinone-2-sulfonate (blue),
sodium 1-hydroxy 2-[4'-(β-sulfato-ethylaminosulfonyl-phenylazo]-8-benzoylamino-naphthalene-3,6-disulfonate (red),
sodium 1-hydroxy-2-[4'-(β-chlorethylsulfonyl)-phenyl-azo]-naphthalene-5-sulfonate (red),
potassium 1-(2'-methoxy-5'-vinylsulfonylphenylazo)-2-hydroxynaphthalene-3,6-disulfonate (yellowish red),
the copper complex compound of potassium-1-(2'-hydroxy-5′-vinylsulfonyl-phenylazo)-2-hydroxynaphthalene-3,6-disulfonate (bluish red), the copper complex compound of sodium 1-hydroxy-2-(2′-hydroxyphenylazo)-8-[3″-(β-chlorethylsulfonyl)-benzoylamino]-naphthalene-3,6,5′-trisulfonate (red violet), the nickel complex compound of sodium 1-[2′-hydroxy-5′-(β-chlorethylaminosulfonyl)-phenylazo]-2-hydroxynaphthalene-3,6-disulfonate (red), sodium 1-hydroxy-2-phenylazo-8-(2″,3″-dichloro-quinoxalyl-6″-carbonylamino)-naphthalene-3,6,2′-trisulfonate (bluish red), sodium salt of copper phthalocyanine-sulfonic acid-[3′-(2″,3″-dichloro-quinoxalyl-6″-carbonyl-amino)-phenylamide]-disulfonic acid (turquoise blue), sodium 1-amino-4-[4′-N-methyl-N-(2″,3″-dichloro-quinoxalyl-6″-carbonylamino)-phenylamino]-anthraquinone-2,2′-disulfonate (blue), sodium 1-hydroxy-2-[4′-(β-sulfato-propionylamino)-phenylazo]-naphthalene-4-sulfonate (red), sodium 1-amino-4-(3′-acryloylaminophenylamino)-anthraquinone-2-sulfonate (blue), the sodium salt of copper phthalocyanine-sulfonic acid-[4′-(β-chloropropionylamino)-phenylamide]-disulfonic acid (turquoise blue), the 1:2-cobalt complex compound of 1-(2′-hydroxy-5′-acryloylamino-phenylazo)-2-hydroxynaphthalene (violet), sodium 1,8-dihydroxy-2-(4′-acryloylamino-phenylazo)-naphthalene-3,6-disulfonate (violet), sodium 1-hydroxy-2-(4′-vinylsulfonylamino-phenylazo)-naphthalene-4-sulfonate (red), sodium 1-hydroxy-2,7-bis-(2′-methoxy-5′-vinylsulfonyl-phenylazo)-8-aminonaphthalene-3,6-disulfonate (bluish gray).

Ammonium acetate, ammonium phosphate or sodium acetate can be used in place of the 2 parts of ammonium sulfate. The pH value of the dyebath under the conditions given above is 6.5 to 8.

*Example 5.*—A dyebath is prepared with 4000 parts of water, 0.2 part of the dye of the Formula (A), 10 parts of anhydrous sodium sulfate, 2 parts of concentrated sulfuric acid, and 1.5 parts of hydroxylamine sulfate. 100 parts of wool are entered at 40°, the bath heated to 100° in 20 minutes and held at this temperature for 1 hour. The dyed wool is rinsed with water and dried. A dyeing appreciably clearer and more brilliant than one dyed without hydroxylamine sulfate is obtained. The light fastness is excellent and the wet fastness good.

In place of the 0.2 part of the above mentioned dye 0.01 to 3 parts of the same dye or one of the following dyes can be used to obtain dyeings of different depths:

sodium 1-(4′-acetylaminophenylazo)-2-amino-8-hydroxynaphthalene-6,2′-disulfonate (bluish red), sodium 1-amino-4-(4′-acetylamino-phenylamino)-anthraquinone-2,5-disulfonate (blue), sodium 1-amino-4-(4′-methyl-2′,3′-nitrophenylamino)-anthraquinone-2-sulfonate (bluish gray), sodium 1-ethoxy-carbonyl-2-hydroxy-4-methyl-6-(4′-chlorophenylamino)-3-azabenzanthrone-2′-sulfonate (bluish red), sodium 1-amino-2-(4′-nitrophenylazo)-7-phenylazo-8-hydroxy-naphthalene-3,6-disulfonate (bluish gray), sodium 1-hydroxy-4-(4′-methylphenylamino)-anthraquinone-2′-sulfonate (violet), 1,4-bis-(4′-methyl-2′-sulfophenylamino)-anthraquinone as the disodium salt (bluish green), sodium 1-amino-2-bromo-4-(4′-methylphenylamino)-anthraquinone-2′-sulfonate (blue), sodium 1,5-dihydroxy-4,8-diamino-anthraquinone-2,6-disulfonate (blue), sodium 1-amino-4-cyclohexylamino-anthraquinone-2-sulfonate (reddish blue)

and the bluish red dye of the formula

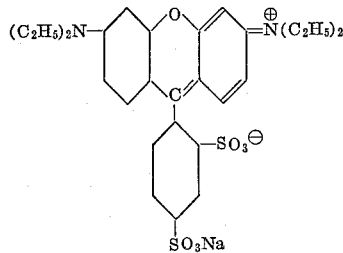

(M)

These dyes are acid dyes of the levelling type.

In place of the 2 parts of concentrated sulfuric acid, 0.5 to 4 parts of concentrated sulfuric acid, 1 to 5 parts of 80% phosphoric acid or 1 to 5 parts of 85% formic acid can be used. The pH value of the dyebath under the conditions given above is 2.5–3.5.

The dyebath of the above composition can contain any of the dyeing assistants mentioned in Example 3, e.g. fluorescent brightening agents, levelling agents, wetting agents and wool protective agents. The 1.5 parts of hydroxylamine sulfate can be replaced by 0.5 to 4 parts of hydroxylamine sulfate and a liquor ratio of 1:5 to 1:100 chosen, especially of 1:30 to 1:60.

*Example 6.*—A dyebath is prepared with 5000 parts of water, 0.2 part of the 1:1-chromium complex compound of sodium 1 - hydroxy - 2 - (2′ - hydroxynaphthyl - 1′-azo)-naphthalene-8-sulfonic acid amide-4′-sulfonate, 10 parts of anhydrous sodium sulfate, 7 parts of concentrated sulfuric acid and 1.5 parts of hydroxylamine sulfate. 100 parts of wool are entered at 40°, the temperature is increased to 100° in 15 minutes and this temperature maintained for 1 hour. The dyed wool is rinsed with water and dried. A blue dyeing is obtained which is considerably clearer and more brilliant than one produced without hydroxylamine sulfate. The light fastness is excellent and the wet fastness good.

To obtain dyeings of different depths the 0.2 part of the above dye can be replaced by 0.05 to 2 parts of the same dye. The 7 parts of concentrated sulfuric acid can be replaced by 5 to 10 parts of concentrated sulfuric acid. The pH value of the dyebath is 1.5 to 2.5 under the aforestated conditions.

The dyebath of the above composition may contain the dyeing assistants mentioned in Example 3, i.e. fluorescent brightening agents, levelling, wetting and wool protective agents. The 1.5 parts of hydroxylamine sulfate can be replaced by 0.5 to 4 parts of hydroxylamine sulfate and the liquor ratio may vary within limits of about 1:8 to 1:100. The dyeing time at 100° may vary from 45 to 120 minutes.

Equally good results are obtained with the 1:1-chromium complexes of sodium 1-phenyl-3-methyl-4-(2″-hydroxy-5″-chlorophenylazo) - 5 - pyrazoline-3′,3″-disulfonate (red), of sodium 1-(2″-hydroxy-5′-nitrophenylazo)-2-hydroxynaphthalene-3′-sulfonate (violet-brown) or of sodium 1-hydroxy-2-(2′-hydroxy-6′-nitro-naphthyl-1′-azo)-naphthalene-8,4′-disulfonate (greenish black).

*Example 7.*—100 parts of unbleached worsted wool yarn are dyed in a dyebath of 4000 parts containing the following additions: 0.25 part of the sodium salt of copper phthalocyanine-disulfonic acid, 2.25 parts of a levelling agent of the alkylpolyglycol ether type, 0.75 part of a surface-active quaternary ammonium compound, 10 parts of calcined sodium sulfate and 1.5 parts of hydroxylamine sulfate. Dyeing is started at 50°, the temperature increased to 95° in 45 minutes and the goods dyed for 45 minutes at this temperature. A brilliant turquoise blue dyeing is obtained. Without the addition of hydroxylamine sulfate a duller, more greenish dyeing results.

Equally good dyeings are obtained with the sodium salts of copper phthalocyanine-monosulfonic acid-monosulfonic acid amide (turquoise blue), of copper phthalocyanine-disulfonic acid-monosulfonic acid amide (turquoise blue), of copper phthalocyanine-monosulfonic acid-disulfonic acid amide (turquoise blue), of copper phthalocyanine-trisulfonic acid (turquoise blue), of copper phthalocyanine-disulfonic acid-disulfonic acid amide (greenish turquoise blue) and of copper phthalocyanine-tetrasulfonic acid (greenish turquoise blue), of metal-free phthalocyanine-di- or trisulfonic acid (turquoise blue), of nickel phthalocyanine-di-or-trisulfonic acid (greenish turquoise blue) and of cobalt phthalocyanine-di-or-trisulfonic acid (green-blue), further with sodium 4-(2''-hydroxynaphthyl-1''-azo)-4'-(4'''-ethoxyphenylazo)-1,1'-diphenyl-6'',8''-disulfonate (red),
sodium 3,3' - dimethyl - 4(2''-hydroxynaphthyl-1''-azo)-4'-(4'''-ethoxyphenylazo)-1,1'-diphenyl-6'',8''-disulfonate (bluish red),
sodium 4-(2''-amino-8''-hydroxynaphthyl-1''-azo)-4'-(3''''-carboxy-4''''-hydroxy-phenylazo)-1,1'-diphenyl-6''-sulfonate (bluish red).

*Example 8.*—100 parts of wool slubbing are dyed in a dyebath consisting of 3000 parts of water, 0.05 part of sodium 1-amino - 2 - (4'-cyclohexyl-phenoxy)-4-(2'', 4'', 6''-trimethylphenylamino)-anthraquinone - 2',3'' - disulfonate and 1 part of hydroxylamine sulfate. Dyeing is started at 50°, the bath heated to 95° in 30 minutes and the goods dyed to shade in 45 minutes at this temperature. A very bright, pale violet dyeing is obtained. Without the addition of hydroxylamine sulfate the dyeing is markedly duller. With the dye sodium 1-benzoyl-2-hydroxy-4-(4'-cyclohexylphenoxy) - 6 - (4''-methylphenylamino) 3-azabenzanthrone - 2',2'' - disulfonate a bright bluish red dyeing is obtained.

*Example 9.*—100 parts of an unbleached knitted wool fabric are dyed with 0.1 part of the 1:2-chromium complex compound of 1-(2'-hydroxyphenylazo)-2-hydroxy-8-acetylamino-naphthalene-5'-sulfonic acid amide and 4 parts of hydroxylamine sulfate in the manner described in Example 8.

The grey dyeing obtained is very much brighter than one dyed without the addition of hydroxylamine sulfate.

With the 1:2-cobalt complex compound of 1-(2'-hydroxy - 5' - dimethylaminosulfonylaminophenylazo)-2-hydroxynaphthalene, a clear bordeaux dyeing is obtained.

*Example 10.*—100 parts of unbleached carpet yarn are dyed by the procedure of Example 8 using 0.1 part of sodium 1-amino - 4 - (4'-acetylaminophenylamino-anthraquinone-2,5-disulfonate and 2 parts of hydroxylamine sulfate. The blue dyeing is of a brilliance which cannot be achieved in the absence of hydroxylamine sulfate except on previously bleached wool.

*Example 11.*—100 parts of a cross-wound package of unbleached worsted wool yarn are dyed in a package dyeing machine from a bath of 1000 parts of water set with 0.1 part of the dye used in Example 1 and 1 part of hydroxylamine sulfate. The procedure is that given in Example 8 and it results in a very bright violet dyeing. A comparable dyeing without hydroxylamine sulfate is much duller.

The liquor ratio in the above Example 11 is 1:10, but an equally valuable dyeing is also obtained with a liquor ratio of 1:5, i.e. in the same package dyeing machine the double amount of wool (200 parts) is dyed from a bath containing 0.2 part of the dye used in Example 1 and 1 part of hydroxylamine sulfate in 1000 parts of water.

*Example 12.*—100 parts of unbleached wool knitting yarn are dyed in 6000 parts of a dyebath containing 0.1 part of sodium 1-amino-4-(2',4',6'-trimethylphenylamino)-anthraquinone-2-sulfonate and 3 parts of hydroxylamine sulfate, by the procedure set forth in Example 8. A bright, light blue dyeing is obtained.

*Example 13.*—100 parts of wool carpet yarn are dyed in 3000 parts of a bath containing 0.2 part of the dye used in Example 9, 1.5 parts of hydroxylamine sulfate, 4 parts of ammonium sulfate and 90 parts of benzyl alcohol. Dyeing is begun at 40°, the bath brought to 60° in 10 minutes and held at 60°–65° for 60 minutes. The dyed good is then rinsed and dried. A clear bluish gray dyeing is obtained. A dyeing produced in exactly the same way but without hydroxylamine sulfate is considerably duller.

*Example 14.*—The dyebath is prepared with 4000 parts of water containing 10 parts of anhydrous sodium sulfate, 1 part of the dye used in Example 12 and 0.5 part of hydroxylamine sulfate. 100 parts of wool fabric are entered into the bath at 40°. The bath is heated to 100° in 30 minutes and is maintained at this temperature for 30 minutes.

The water lost by evaporation is continuously replaced during the dyeing process.

The dyed wool is removed from the bath, rinsed and dried.

The blue dyeing is appreciably brighter than a comparable dyeing produced without the addition of hydroxylamine sulfate.

*Example 15.*—100 parts of unbleached carpet yarn are dyed for 1 hour at 100° in a dyebath containing 0.1 part of the 1:2-chromium complex compound of 1-(2'-hydroxy - 5' - methylsulfonylphenylazo) - 2 - hydroxy - 8 - ethoxycarbonylamino-naphthalene, 1.5 parts of hydroxylamine sulfate, 1.5 parts of a levelling agent of an alkylaminopolyglycolether type and 2000 parts of water.

The grey dyeing obtained is much clearer in shade than that obtained on the same yarn in the absence of hydroxylamine sulfate.

*Example 16.*—100 parts of unbleached wool fabric are padded with a solution of the following composition:

| | |
|---|---|
| Part of the dye used in Example 1 | 1 |
| Parts of carob bean meal | 8 |
| Parts of 100% acetic acid | 5 |
| Parts of octylphenyltetraglycol ether | 7 |
| Parts of 100% dodecylpolyglycol ether sulfate with an average of 3 etheneoxy groups | 7 |
| Parts of hydroxylamine sulfate | 15 |
| Parts of water | 957 |
| Parts total | 1000 |

The impregnated wool is squeezed to a pick up of 100% and without drying steamed for 10 minutes with saturated steam of about 100°. It is then rinsed with water and dried. The obtained light violet dyeing is brighter and faster to light than a similar dyeing produced without the hydroxylamine sulfate.

By replacing the hydroxylamine sulfate by the same amount of hydroxylamine chlorhydrate, phosphate or acetate or by employing a concentrated aqueous solution containing 6 parts of hydroxylamine and increasing the amount of acetic acid to 16 parts, the same good results are obtained.

The fixation of the dye is also performed by conditioning the impregnated wool for 2 hours at 95° in a box with constant humidity:

The dyes used in the Examples 3 to 9 give also excellent dyeings when applied according to the above procedure.

*Example 17.*—100 parts of woollen fabric are dyed in 4000 parts of water containing 0.06 part of sodium 1-(4'-acetylaminophenylazo) - 2 - amino - 8 - hydroxynaphthalene-6,2'-disulfonate, 0.08 part of sodium 1-amino-4-(4'-acetylaminophenylamino) - anthraquinone - 2,5 - disulfonate, 10 parts of anhydrous sodium sulfate, 3 parts of sulfuric acid, and 1 part of hydroxylamine sulfate.

Dyeing is commenced at 50°. The temperature of the dye liquor is raised to 100° in 30 minutes and dyeing is continued at this temperature for 60 minutes.

The dyeing obtained is much brighter than obtained under identical conditions in the absence of hydroxylamine sulfate.

*Example 18.*—100 parts of knitted wool material is dyed in a dyebath consisting of 0.3 part of 1,4-di-(2',4',6'- trimethyl-3' - sulfophenylamino)-anthraquinone as disodium salt, 1.2 parts of hydroxylamine sulfate, 2 parts of monoammonium phosphate and 10,000 parts of water.

The dyeing is commenced at 40°. The temperature is raised to 100° in 60 minutes and dyeing is continued at this temperature for 30 minutes. A bright blue dyeing is obtained.

*Example 19.*—A printing paste is prepared with:

| | |
|---|---|
| Part of the dye of Formula (I) | 0.5 |
| Parts of thiodiethylene glycol | 25 |
| Parts of urea | 50 |
| Parts of gum tragacanth (6%) | 400 |
| Parts of ammonium tartrate solution 1:2 | 30 |
| Parts of hydroxylamine sulfate | 10 |
| Parts of a foam inhibitor based on a higher-molecular liquid alcohol | 10 |
| Parts of water | 484.5 |
| Parts total | 1010.0 |

The paste is printed on wool muslin, steamed for 40 minutes at 102°–103°, rinsed in cold water and dried. The blue print thus obtained has a brighter, clearer shade than one produced without the addition of hydroxylamine. The light fastness is substantially better than, and the wet fastness properties equally as good as, those of prints made by conventional methods.

The 10 parts of hydroxylamine sulfate also can be replaced by larger amounts. As the addition of hydroxylamine sulfate is increased, e.g. to 15 to 40 parts, or preferably 10 to 20 parts, the prints are increasingly brighter.

The printing paste can also be prepared with an acid such as sulfuric, phosphoric, acetic or formic acid, ammonium sulfate or compounds which give a weakly acid, neutral to weakly alkaline pH value, such as ammonium acetate, ammonium phosphate or sodium acetate.

The printing paste may also contain other assistants like those named in Example 3, i.e. levelling, wetting, and wool protective agents.

The printing assistants such as thiodiethylene glycol or urea can be replaced by other assistants such as butyl carbitol, benzyl alcohol, glycerol etc.

In place of the 0.5 part of the dye used above prints of different depth with the same effect can be produced with 0.01 to 3 parts of the same dye or one of the following dyes:

The blue dyes of Formulae (A) and (H), the violet dyes of Formulae (B) and (C), the red dye of Formula (M), the green dyes of Formulae (K) and (L), the violet dyes used in Examples 1, 3 and 8, the blue dyes used in Examples 2, 6, 10, 12 and 18, the turquoise blue dyes used in Example 7, the gray dyes used in Examples 4, 9 and 15, the reactive dyes mentioned in Example 4, the 1:2 chromium complex compound of 1-phenyl-3-methyl-4-(2''-hydroxy-3''-nitro-5''-chlorophenylazo)-5-pyrazolone-3'-sulfonic acid-methylamide (bluish red),
sodium 2,2'-dichloro-4-[2''-(2''',4''',6'''-trimethyl-phenylamino)-8''-hydroxy-naphthyl-1''-azo]-4'-n-octyloxy-carbonylamino-1,1'-diphenyl-5,6''-disulfonate (bluish red),
sodium 2,2'-dimethyl-4-(2''-amino-8''-hydroxy-naphthyl-1''-azo)-4'-(β-phenoxy-ethoxycarbonylamino)-1,1'-diphenyl-6''-sulfonic acid-ethylamide-5-sulfonate (red),
sodium 1-[4'-(4''-amylphenoxy)-phenylazo]-2-(2''',4''',6'''-trimethylphenylamino)-8-hydroxynaphthalene-6,2'-disulfonate (bluish red),
sodium 4,4'-di-(2''-phenylamino-carbonyl-naphthyl-1''-azo)-1,1'-diphenyl-2,2'-disulfonate (bluish red),
4,4'-di-(4''-amino-3''-sulfo-anthraquinonyl-1''-amino)-1,1'-diphenylmethane as the disodium salt (blue),
sodium 1-amino-4-(2',4',6'-trimethyl-3',5'-dibromo-phenylamino)-anthraquinone-2-sulfonate (reddish blue),
1,4-di-(2',4',6'-trimethyl-3'-bromo-5'-sulfo-phenylamino)-anthraquinone as the disodium salt (reddish blue),
sodium 1-benzoyl-2-hydroxy-4-(4'-cyclohexylphenoxy)-6-(4''-methylphenylamino)-3-azabenzanthrone-2',2''-disulfonate (bluish red),
sodium 1-ethoxycarbonyl-2-hydroxy-4-methyl-6-(4'-methylphenylamino)-3-azabenzanthrone-2'-sulfonate (reddish violet),
sodium 1-amino-4-(4'-methyl2'/3'-nitrophenylamino)-anthraquinone-2-sulfonate (bluish gray),
1,4-di-(4'-phenoxy-2'-sulfophenylamino)-anthraquinone as the disodium salt (bluish green),
sodium 1-[2'-methyl-4'(1''-hyroxy-6''-phenylamino-naphthyl-2''-azo)-5'-methoxy-phenylazo]-8-hydroxy-naphthalene-3,6,3'''-trisulfonate (reddish blue),
sodium 1-hydroxy 2-(2'-benzyloxy-5'-chlorophenylazo)-8-(4''-methylphenylsulfonylamino)-naphthalene-3,6-disulfonate (bluish red),
sodium 4-(2''-hydroxynaphthyl-1''-azo)-4'-(4'''-phenylsulfonyloxy-phenylazo)-1,1'-diphenyl-6'',8''-disulfonate (yellowish red),
sodium 1-hydroxy-2-(2'-phenoxy-phenylazo)-7-[4''-(4'''-methyl-phenylsulfonyloxy)-phenylazo]-naphthalene-3,6-disulfonate (red),
sodium 1-(4'-phenylazo-naphthyl-1''-azo)-4-phenyl-aminonaphthalene-5,2''-disulfonate (reddish navy),
sodium 1-amino-2-(4'-nitrophenylazo)-7-phenylazo-8-hydroxynaphthalene-3,6-disulfonate (bluish black),
sodium 1-hydroxy-2-(2'-phenoxy-5'-chorophenyl-azo)-8-(4''-methylphenylsulfonylamino)-naphthalene-3,6-disulfonate (bluish red).

Having thus disclosed the invention what I claim is:

1. A process for dyeing wool which comprises applying to the wool an aqueous solution containing as essential ingredients 0.5 to 5% of a water-soluble hydroxylamine salt and a water-soluble dye selected from the group consisting of an acid dye, a reactive dye and a direct dye and subjecting the wool to a wet heat treatment at temperatures ranging from 60° to 110° C. for at least 5 minutes.

2. A process according to claim 1 wherein the dye is an acid dye and the dyeing is carried out in one step in a dyebath.

3. Wool dyed according to the process claimed in claim 1.

4. A process according to claim 1, wherein the dyeing process is carried out in one step in a dyebath.

5. A process for dyeing wool according to claim 4, wherein dyeing is carried out in a dyebath containing 0.5 to 5% of a water-soluble hydroxylamine salt selected from the group consisting of the formate, acetate, propionate, lower alkanesulfonate, benzene-, toluene- and xylene-sulfonate, phosphate, sulfamate, fluosilicate, bromide, chloride, neutral sulfate, acid sulfate, magnesium sulfate double salt, magnesium chloride double salt, and calcium chloride double salt and 0.005 to 5% of a water-soluble dye selected from the group consisting of an acid dye, a reactive dye and a direct dye, at temperatures ranging from 85° C. to the boiling temperature for 30 to 90 minutes.

6. A process for dyeing wool according to claim 5, wherein the dyebath contains 1 to 3% of hydroxylamine sulfate and 0.02 to 1% of an acid dye.

7. A process for dyeing wool according to claim 6, wherein the dyebath contains 1 to 3% of hydroxylamine sulfate and 0.02 to 1% of a reactive dye.

8. A process for dyeing wool according to claim 6, wherein the dyebath contains 1 to 3% of hydroxylamine sulfate and 0.02 to 1% of a direct dye.

9. A process according to claim 1, wherein the dyeing process is carried out in two steps.

10. A process according to claim 9, wherein wool is impregnated with an aqueous solution containing 0.5 to 5% of a water-soluble hydroxylamine salt selected from the group consisting of the formate, acetate, propionate, lower alkanesulfonate, benzene-, toluene- and xylene-sulfonate, phosphate, sulfamate, fluosilicate, bromide, chloride, neutral sulfate, acid sulfate, magnesium sulfate double salt, magnesium chloride double salt, and calcium chloride double salt and 0.005 to 5% of a water-soluble dye selected from the group consisting of an acid dye, a reactive dye and a direct dye and steamed.

11. A process according to claim 9, wherein wool is impregnated with a padding liquor containing 0.5 to 5% of a water-soluble hydroxylamine salt selected from the group consisting of the formate, acetate, propionate, lower alkane-sulfonate, benzene-, toluene- and xylene-sulfonate, phosphate, sulfamate, fluosilicate, bromide, chloride, neutral sulfate, acid sulfate, magnesium sulfate double salt, magnesium chloride double salt, and calcium chloride double salt and 0.005 to 5% of a water-soluble dye selected from the group consisting of an acid dye, a reactive dye and a direct dye and stored during 60 to 240 minutes at temperatures ranging from 60° to 110° C.

12. A process according to claim 9, wherein wool is printed with a printing paste containing 0.5 to 5% of a water-soluble hydroxylamine salt selected from the group consisting of the formate, acetate, propionate, lower alkane-sulfonate, benzene-, toluene- and xylene-sulfonate, phosphate, sulfamate, fluosilicate, bromide, chloride, neutral sulfate, acid sulfate, magnesium sulfate double salt, and calcium chloride double salt and 0.005 to 5% of a water-soluble dye selected from the group consisting of an acid dye, a reactive dye and a direct dye and steamed.

References Cited by the Examiner
UNITED STATES PATENTS

| | | | |
|---|---|---|---|
| 1,758,877 | 5/1930 | Sleeper | 8—82 |
| 2,937,067 | 5/1960 | Khachoyan et al. | 8—62 X |

FOREIGN PATENTS 846,079  8/1960  Great Britain.

NORMAN G. TORCHIN, *Primary Examiner.*

ALEXANDER D. RICCI, *Examiner.*

T. J. HERBERT, *Assistant Examiner.*